US011289055B2

(12) United States Patent
Chen et al.

(10) Patent No.: US 11,289,055 B2
(45) Date of Patent: Mar. 29, 2022

(54) DISPLAY DEVICE AND OPERATING METHOD THEREOF

(71) Applicant: Wistron Corporation, New Taipei (TW)

(72) Inventors: Feng-Yuan Chen, New Taipei (TW); Chou-Chieh Chang, New Taipei (TW); Kang-Ming Peng, New Taipei (TW); Cheng-I Shih, New Taipei (TW)

(73) Assignee: Wistron Corporation, New Taipei (TW)

( * ) Notice: Subject to any disclaimer, the term of this patent is extended or adjusted under 35 U.S.C. 154(b) by 11 days.

(21) Appl. No.: 16/425,926

(22) Filed: May 29, 2019

(65) Prior Publication Data

US 2020/0302895 A1 Sep. 24, 2020

(30) Foreign Application Priority Data

Mar. 20, 2019 (TW) ................................ 108109529

(51) Int. Cl.
*G09G 5/14* (2006.01)
*G06F 3/033* (2013.01)
*G09G 5/08* (2006.01)

(52) U.S. Cl.
CPC ........... *G09G 5/14* (2013.01); *G09G 2352/00* (2013.01); *G09G 2354/00* (2013.01)

(58) Field of Classification Search
CPC ............. G09G 5/14; G09G 5/08; G06F 3/033
(Continued)

(56) References Cited

U.S. PATENT DOCUMENTS 5,606,345 A * 2/1997 Truchet ................. G06F 3/0489 715/788
8,902,273 B2 * 12/2014 Cho ....................... H04N 7/141 348/14.01

(Continued)

FOREIGN PATENT DOCUMENTS

CN 108628402 10/2018
TW M501591 5/2015
TW I630542 7/2018

OTHER PUBLICATIONS

"Office Action of Taiwan Counterpart Application", dated Sep. 19, 2019, pp. 1-8.

(Continued)

*Primary Examiner* — Kwin Xie
(74) *Attorney, Agent, or Firm* — JCIPRNET

(57) ABSTRACT

A display device and an operating method thereof are provided. The display device includes a display panel, a connector, a controller and a multiplexer. The display panel is configured to simultaneously display a plurality of images of a plurality of external hosts. The connector is configured to connect at least one peripheral apparatus. The controller is coupled to the display panel, the connector and the external hosts, and configured to generate a control signal. The multiplexer is coupled between the controller, the connector and the external hosts, and configured to switch an access right of the at least one peripheral apparatus to one of the external hosts according to the control signal. The controller receives switching information from the external hosts and generates the control signal according to the switching information.

20 Claims, 6 Drawing Sheets

(58) Field of Classification Search
USPC .................................................. 345/156–169
See application file for complete search history.

(56) References Cited

U.S. PATENT DOCUMENTS

| | | | | |
|---|---|---|---|---|
| 10,394,376 | B2 | 8/2019 | Hosokawa | |
| 10,635,233 | B2 | 4/2020 | Hosokawa | |
| 2006/0195637 | A1* | 8/2006 | Zhang ................ | H04N 21/4113 710/72 |
| 2009/0128504 | A1* | 5/2009 | Smith ................. | G06F 3/04883 345/173 |
| 2011/0239142 | A1* | 9/2011 | Steeves ............. | H04M 1/72522 715/764 |
| 2013/0019263 | A1* | 1/2013 | Ferren .............. | H04N 21/42209 725/37 |
| 2013/0162502 | A1* | 6/2013 | Lee ...................... | H04N 5/4403 345/1.2 |
| 2015/0356045 | A1* | 12/2015 | Soffer ................... | G06F 3/1446 710/303 |
| 2018/0275814 | A1 | 9/2018 | Hosokawa | |
| 2019/0332221 | A1 | 10/2019 | Hosokawa | |

OTHER PUBLICATIONS

"Office Action of Taiwan Counterpart Application", dated Feb. 26, 2020, p. 1-p. 10.
"Office Action of Taiwan Counterpart Application", dated Apr. 24, 2020, p. 1-p. 7.

* cited by examiner

DISPLAY DEVICE AND OPERATING METHOD THEREOF

CROSS-REFERENCE TO RELATED APPLICATION

This application claims the priority benefit of Taiwan application serial no. 108109529, filed on Mar. 20, 2019. The entirety of the above-mentioned patent application is hereby incorporated by reference herein and made a part of this specification.

BACKGROUND OF THE INVENTION

1. Field of the Invention

The invention relates to a display technology, and particularly relates to a display device capable of being simultaneously connected with a peripheral apparatus and a plurality of hosts and an operating method thereof.

2. Description of Related Art

Currently, some displays are compatible with display methods such as picture in picture (PIP) and/or picture by picture (PBP), etc. A display of this kind is capable of being connected with a plurality of hosts and simultaneously displaying images provided by the hosts. Such a display method offers great convenience in scenarios such as meetings, etc.

Even though the display method allows the user to conveniently view the images of the hosts from the display at the same time, the user is unable to freely control the respective hosts. For example, in a conference, the user may need to use a peripheral apparatus, such as a keyboard or a mouse, around the user to operate the images displayed on the display.

SUMMARY OF THE INVENTION

In view of the above, the embodiments of the invention provide a display device and an operating method thereof capable of switching an access right of a peripheral apparatus, such as a keyboard, a mouse, etc., among a plurality of hosts, thereby making the use more convenient.

An embodiment of the invention provides a display device including a display panel, a connector, a controller, and a multiplexer. The display panel is configured to simultaneously display a plurality of images of a plurality of external hosts. The connector is configured to connect at least one peripheral apparatus. The controller is coupled to the display panel, the connector and the external hosts, and configured to generate a control signal. The multiplexer is coupled between the controller, the connector and the external hosts, and configured to switch an access right of the at least one peripheral apparatus to one of the external hosts according to the control signal. The controller receives switching information from the external hosts and generates the control signal according to the switching information.

An embodiment of the invention provides an operating method of a display device. The display device is connected with a plurality of external hosts and at least one peripheral apparatus. The operating method includes: simultaneously displaying a plurality of images of the external hosts through a display panel; generating a control signal; switching an access right of the at least one peripheral apparatus to one of the external hosts according to the control signal; receiving switching information from the external hosts; and generating the control signal according to the switching information.

An embodiment of the invention provides a display device including a controller, a display panel, and a connector. The controller is coupled to a plurality of external hosts. The display panel is coupled to the controller and configured to simultaneously display a plurality of images of the external hosts. The connector is coupled to the controller and configured to be connected with a mouse. One of the external hosts has an access right of the mouse. The controller is further configured to: receive a mouse coordinate from the external host having the access right of the mouse; convert the mouse coordinate into a display panel coordinate according to a layout of the images on the display panel; and start a screen setting process according to the display panel coordinate.

Based on the above, the display device and the operating method thereof according to the embodiments of the invention are capable of connecting the plurality of external hosts and the peripheral apparatus such as the keyboard, the mouse, etc., and are capable of favorably switching the access right of the peripheral apparatus among the external hosts while simultaneously displaying the images of the external hosts.

To make the above features and advantages of the invention more comprehensible, embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
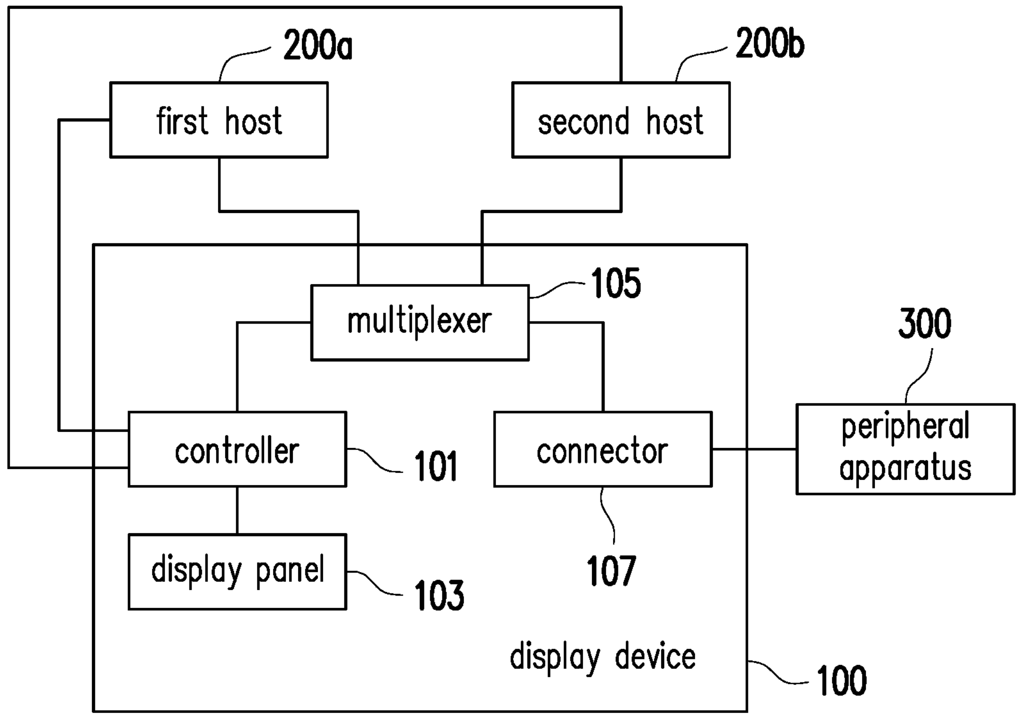
FIG. 1 is a schematic block diagram illustrating a display device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic block diagram illustrating a display device according to an embodiment of the invention.

Referring to FIG. 1, a display device 100 may be simultaneously connected with a plurality of external hosts (e.g., a first host 200*a* and a second host 200*b*) and a peripheral apparatus 300. The peripheral apparatus 300 includes, for example, a keyboard, a mouse, and/or a storage device such as a hard drive, etc. However, the invention does not intend to impose a limitation on this regard. In the embodiment, the display device 100 capable of switching an access right of the peripheral apparatus 300 among the external hosts according to the actual situation in which the external host (e.g., the first host 200*a* or the second host 200*b*) accesses the peripheral apparatus 300.

Specifically, the display device 100 includes a controller 101, a display panel 103, a multiplexer 105, and a connector 107.

In the embodiment, the controller 101 is a scalar, for example, coupled to the display panel 103, the multiplexer 105, the first host 200*a*, and the second host 200*b*. The controller 101 may receive image signals from the first host 200*a* and the second host 200*b* and process the image signals to allow the display panel 103 to simultaneously display the images of the first host 200*a* and the second host 200*b*. The method for displaying the images includes picture-in-picture (PIP) and/or picture-by-picture (PBP), etc. However, the invention does not intend to limit the type of the controller 101. In other embodiments, the controller 101 may also be implemented with other devices having computing capability.

In the embodiment, the connector 107 is, for example, a universal serial bus (USB) hub with which one or more peripheral apparatuses 300 can be connected. However, the invention does not intend to limit the type or the interface of the connector 107.

In the embodiment, the multiplexer 105 is connected between the controller 101, the connector 107, the first host 200*a* and the second host 200*b*, and is capable of changing the connection relationship between the connector 107, the first host 200*a* and the second host 200*b* according to the instruction of the controller 101, so as to switch the access right of the peripheral apparatus 300 between the first host 200*a* and the second host 200*b*. It should be noted that, while several embodiments of the invention are described herein using the first host 200*a* and the second host 200*b* as an example of the plurality of external hosts, the invention does not intend to limit the actual number of the external hosts.

For example, the peripheral apparatus 300 includes a keyboard, a mouse, and a storage device, etc. When the multiplexer 105 switches the access right of the peripheral apparatus 300 to the first host 200*a*, the first host 200*a* is able to access the data of the keyboard, the mouse, and the storage device. Therefore, the first host 200*a* can be operated with the keyboard and the mouse, and the first host 200*a* can read and write the storage device. Alternatively, when the multiplexer 105 switches the access right of the peripheral apparatus 300 to the second host 200*b*, the second host 200*b* is able to access the data of the keyboard, the mouse, and the storage device. Therefore, the second host 200*b* can be operated with the mouse and the keyboard, and the second host 200*b* can read and write the storage device.

Figure 2A:
FIG. 2A is a schematic view illustrating images arranged as PBP according to an embodiment of the invention.
Figure 2B:
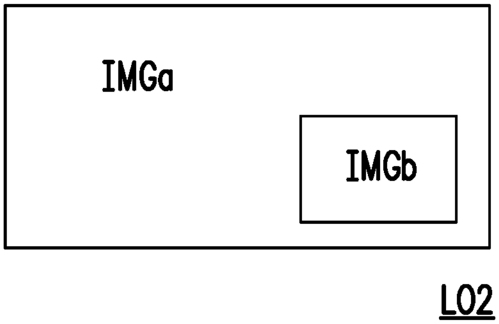
FIG. 2B is a schematic view illustrating images arranged as PIP according to an embodiment of the invention.

FIG. 2A is a schematic view illustrating images arranged as PBP according to an embodiment of the invention. FIG. 2B is a schematic view illustrating images arranged as PIP according to an embodiment of the invention.

Referring to FIG. 2A, in some embodiments, the controller 101 controls the display panel 103 to display a first image IMGa of the first host 200*a* and a second image IMGb of the second host 200*b* according to a PBP-based layout LO1, for example. In the layout LO1, the first image IMGa and the second image IMGb are displayed side by side on the left and the right of the display panel 103, respectively, and are not overlapped with each other. In addition, each of the first image IMGa and the second image IMGb takes up a half of the area.

With the display method according to the layout LO1, the user may encounter the following issues. When the cursor of the mouse within the first image IMGa is moved to the right boundary of the first image IMGa, the cursor of the mouse is unable to be switched to and moved into the second image IMGb. That is because the first host 200*a* has the access right of the mouse such that the cursor of the mouse is unable to be switched to and moved into in the first image IMGa. Also, when the cursor of the mouse within the second image IMGb is moved to the left boundary of the second image IMGb, the cursor of the mouse is unable to be switched to and moved in the first image IMGa. That is because the second host 200*b* has the access right of the mouse such that the cursor of the mouse is unable to be switched to and moved into the second image IMGb.

Referring to FIG. 2B, in some embodiments, the controller 101 controls the display panel 103 to display the first image IMGa of the first host 200*a* and the second image IMGb of the second host 200*b* according to a PIP-based layout LO2, for example. In the layout LO2, the second image IMGb is overlapped with the first image IMGa and shields the bottom right area of the first image IMGa.

With the display method according to the layout LO2, the user may encounter the following issues. When the cursor of the mouse within the first image IMGa is moved to the display area of the second image IMGb, the cursor of the mouse is unable to be switched to and moved in the second image IMGb. That is because only the first host 200*a* has the access right of the mouse such that the cursor of the mouse is unable to be switched to and moved into the second image IMGb. When the cursor of the mouse within the second image IMGb is moved to the boundary of the second image IMGb, the cursor of the mouse is unable to be switched to and moved into the first image IMGa. That is because only the second host 200*b* has the access right of the mouse such that the cursor of the mouse is unable to be switched to and moved into the first image IMGa. Also, when the cursor of the mouse within the first image IMGa is moved to the display area of the second image IMGb, the cursor of the mouse cannot perform an operation on the portion of the first image IMGa. That is because the second image IMGb shields a portion of the first image IMGa.

Several embodiments will be described in the following to demonstrate how these issues are addressed in the display device 100. It should be noted that the invention is not limited thereto.

Figure 3:
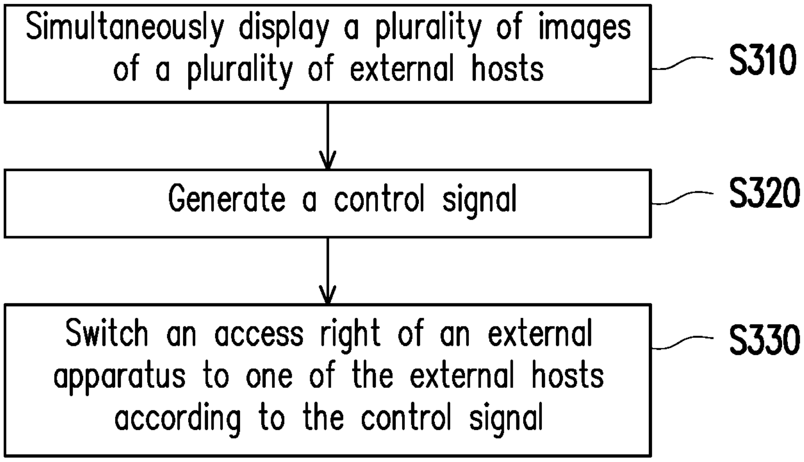
FIG. 3 is a flowchart illustrating an operating method of a display device according to an embodiment of the invention.

FIG. 3 is a flowchart illustrating an operating method of a display device according to an embodiment of the invention. Referring to FIG. 3, firstly, the controller 101 may receive image signals from the external hosts and controls the display panel 103 to simultaneously display the images of the external hosts (Step S310). In some embodiments, the display panel 103 may display the first image IMGa of the first host 200$a$ and the second image IMGb of the second host 200$b$ according to the layout LO1 or the layout LO2, for example.

Then, under some circumstances, the controller 101 generates a control signal (Step S320) and transmits the control signal to the multiplexer 105, so that the multiplexer 105 switches the access right of the peripheral apparatus 300 to one of the external hosts according to the control signal (Step S330). In some embodiments, the controller 101 generates the control signal and transmits the control signal to the multiplexer 105, so that the multiplexer 105 switches the access right of the peripheral apparatus 300 from the first host 200$a$ to the second host 200$b$ according to the control signal.

Figure 4A:
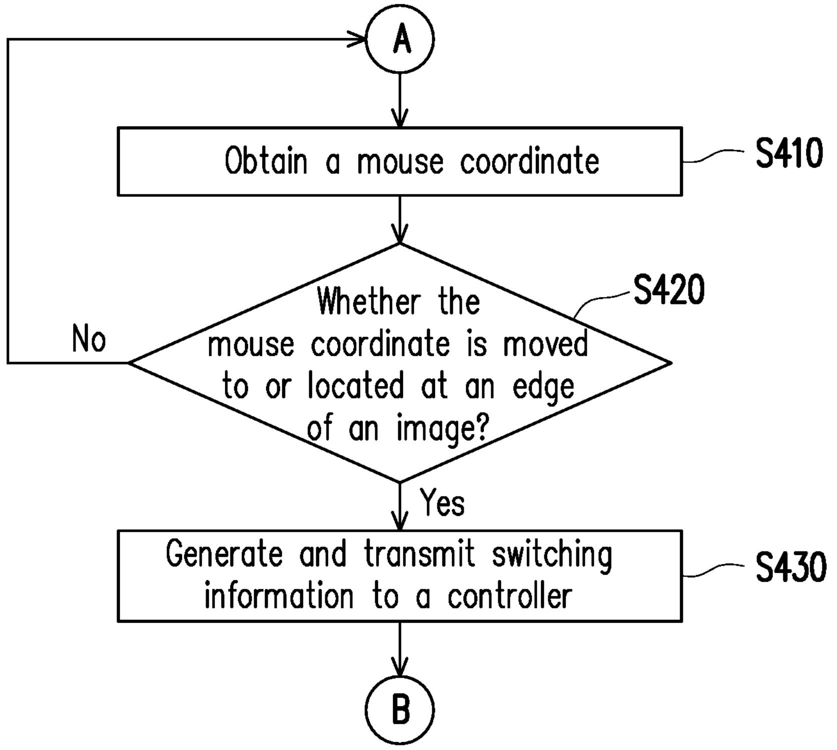
FIGS. 4A and 4B are flowcharts illustrating an operating method of external hosts and a display device according to an embodiment of the invention.
Figure 4B:
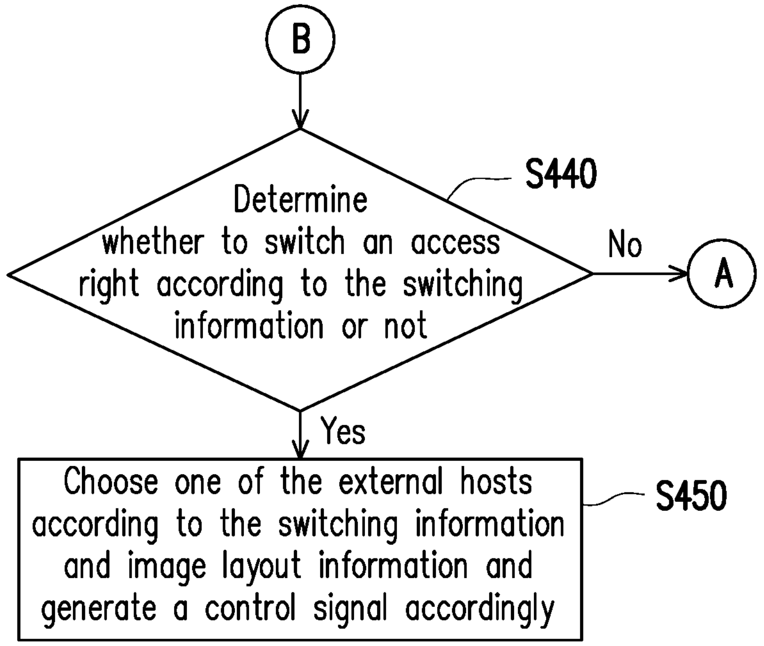

FIGS. 4A and 4B are flowcharts illustrating an operating method of external hosts and a display device according to an embodiment of the invention. In the embodiment, the controller 101 may be informed of the layout information of the images on the display panel 103. More specifically, the controller 101 may be informed of the image display method of the display panel 103 (e.g., PIP or PBP), the configuration of the images included in the image display method, and the external host corresponding to each image. When the external host having the access right of the peripheral apparatus 300 detects that the mouse coordinate is moved to or located at an edge of the image of the external host, the external host generates switching information and transmits the switching information to the controller 101 of the display device 100. The controller 101 then determines whether to switch the access right of the peripheral apparatus 300 to another external host according to the switching information and the image layout information.

Referring to FIG. 4A, the external host having the access right of the peripheral apparatus 300 accesses the mouse coordinate (Step S410) and determines whether the mouse coordinate is moved to or located at the edge of the image of the external host according to the mouse coordinate that is accessed (S420). When the mouse coordinate is determined as being moved to or located at the edge of the image of the external host, the switching information is generated and transmitted to the controller 101 of the display device 100 (Step S430). In the embodiment, the second host 200$b$ has the access right of the peripheral apparatus 300, and the peripheral apparatus 300 includes a mouse.

Referring to FIG. 4B, after receiving the switching information, the controller 101 determines whether to switch the access right according to the switching information and the image layout information or not (Step S440). If yes, the controller 101 chooses one of the external hosts according to the switching information and the image layout information and generates the control signal accordingly (Step S450). The control signal is transmitted to the multiplexer 105 to switch the access right of the peripheral apparatus 300 to the chosen external host.

Taking the layout LO1 (PBP) as an example, the second host 200$b$ determines whether the mouse coordinates are moved to the edge (e.g., an upper edge, a lower edge, a left edge, or a right edge) of the second image IMGb after accessing the mouse coordinate, and the second host 200$b$ generates the switching information and transmits the switching information to the controller 101 of the display device 100 when the mouse coordinate is moved to or located at the edge of the second image IMGb.

For example, the switching information may include directional information (e.g., upper, lower, left, or right), so as to indicate to which edge of the second image IMGb the mouse coordinate is moved. The switching information may further include edge position information (e.g., which position on the left edge). Accordingly, after receiving the switching information from the second host 200$b$, the controller 101 is able to determine whether there is an image of another external host in the direction indicated in the direction information of the switching information of the second image IMGb according to the layout LO1. If there is an image of another external host in the direction indicated in the direction information of the switching information of the second image IMGb, it is necessary to switch the access right. Alternatively, if there no image of another external host in the direction indicated in the direction information of the switching information of the second image IMGb, it is not necessary to switch the access right. In the embodiment, if the direction indicated in the direction information in the switching information from the second host 200$b$ is "left", the controller 101 determines that it is necessary to switch the access right. At this time, the controller 101 may determine that the first host 200$a$ corresponding to the first image IMGa to the left of the second image IMGb has the access right of the peripheral apparatus 300, and generate the control signal according to the switching information, so that the multiplexer 105 may switch the access right of the peripheral apparatus 300 to the first host 200$a$ according to the control signal. When obtaining the access right of the peripheral apparatus 300, the first host 200$a$ may receive the edge position information included in the switching information from the controller 101, so as to be informed of the position at which the mouse coordinate is located on the right edge of the first image IMGa accordingly. Therefore, in the embodiment, the user may observe that the cursor of the mouse displayed on the display panel 103 is smoothly moved from the second image IMGb to the first image IMGa.

In the embodiment, if the direction indicated in the direction information in the switching information from the second host 200$b$ is "upper/top", "lower/bottom", or "right", the controller 101 determines that it is not necessary to switch the access right. At this time, the cursor of the mouse displayed on the display panel 103 stays on the edge of the second image IMGb.

Accordingly, the display device 100 is able to automatically switch the access right of the peripheral apparatus 300 among the external hosts, thereby bringing forth favorable user experiences.

Taking the layout LO2 (PIP) as an example, the second host 200$b$ determines whether the mouse coordinate is moved to the edge (e.g., the upper edge, the lower edge, the left edge, or the right edge) of the second image IMGb (the sub-image) after accessing the mouse coordinate. The second host 200$b$ generates the switching information and transmits the switching information to the controller 101 of the display device 100 when the mouse coordinate is moved to the edge of the second image IMGb. In particular, in the layout with a sub-image and a main image, such an operation is only carried out when the switching is from the sub-image to the main image.

For example, the switching information may include directional information (e.g., upper/top, lower/bottom, left, or right), so as to indicate to which edge of the second image IMGb the mouse coordinate is moved to. Accordingly, after receiving the switching information from the second host 200$b$, the controller 101 is able to determine whether there is an image of another external host in the direction indicated in the direction information of the switching information of the second image IMGb according to the layout LO2. If there is an image of another external host in the direction indicated in the direction information of the switching information of the second image IMGb, it is necessary to switch the access right. Alternatively, if there is no image of another external host in the direction indicated in the direction information of the switching information of the second image IMGb, it is not necessary to switch the access right. In the layout LO2, it is necessary to switch the access right regardless of whether the direction in the direction information in the switching information from the second host 200*b* is "upper/top", "lower/bottom", "left", or "right". Therefore, the controller 101 may choose the first host 200*a* corresponding to the first image IMGa to the upper, lower, left, or right of the second image IMGb and generate the control signal accordingly, so that the multiplexer 105 may switch the access right of the peripheral apparatus 300 to the first host 200*a*.

Particularly, in some embodiments, the user may further determine the contents of the switching signal on his/her own. For example, the user may determine of which peripheral apparatus 300 or transmission interface the access right is to be switched.

Specifically, the switching of the transmission interface includes switching of USB 2.x (e.g., USB2.0, USB2.1, etc.) and switching of USB 3.x (e.g., USB3.0, USB3.1, USB3.2, etc.). For example, when the peripheral apparatus 300 includes a keyboard, a mouse, and a storage device, the switching of USB 2.x is directed to switching of a keyboard and a mouse using USB 2.x interface, and the switching of USB 3.x is directed to switching of the keyboard, the mouse, and a storage device using USB 3.x interface. If the user does not hit a special key (e.g., a key combination) on the keyboard when the cursor of the mouse is moved to the left edge of the second image IMGb, the switching that the user intends to perform is the switching of USB 3.x, i.e., the switching of the access right of the keyboard, the mouse, and the storage device. Alternatively, the user may hit a special key (e.g., a key combination) on the keyboard when the cursor of the mouse is moved to the left edge of the second image IMGb to choose to perform the switching of USB 2.x, i.e., switching only the access right of the keyboard and the mouse but not switching the access right of the storage device. From another perspective, if the user hits the special key on the keyboard when the cursor of the mouse is moved to the left edge of the second image IMGb, the contents of the switching signal are changed. Hence, the controller 101 is able to choose some of the peripheral apparatuses 300 and generate the control signal according to the switching signal, so that the multiplexer 105 may switch only the access right of the chosen peripheral apparatuses 300 (e.g., switching only the access right of the keyboard and the mouse but not switching the access right of the storage device) when switching the access right of the peripheral apparatuses 300. However, people having ordinary skills in the art may modify the peripheral apparatus 300 of which the access right is to be switched and how the switching signal is changed. The invention does not intend to impose a limitation on this regard.

Figure 5:
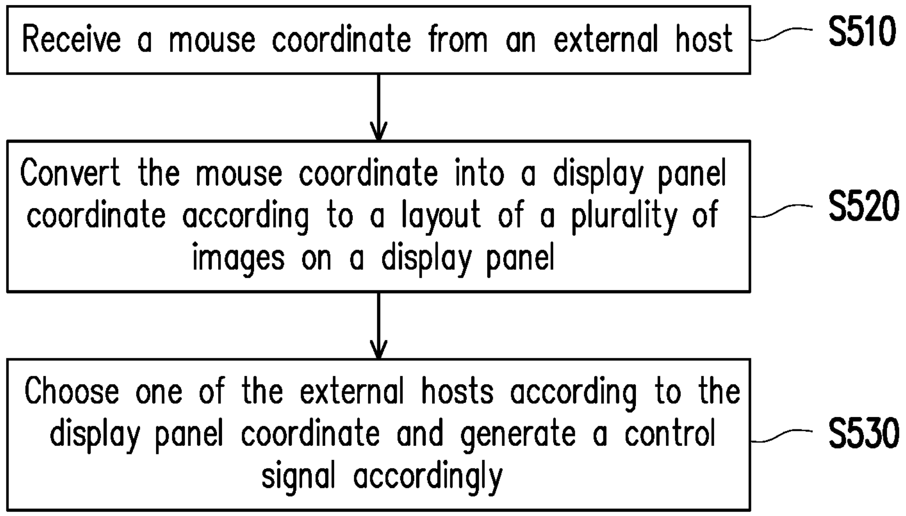
FIG. 5 is a flowchart illustrating an operating method of a display device according to an embodiment of the invention.

FIG. 5 is a flowchart illustrating an operating method of a display device according to an embodiment of the invention. In the embodiment, the display device 100 makes a determination on its own for switching the access right of the peripheral apparatus 300.

Referring to FIG. 5, firstly, the controller 101 of the display device 100 keeps receiving the mouse coordinates of the external host from the external host having the access right of the peripheral apparatus 300 (Step S510). Then, the controller 101 converts the mouse coordinates into display panel coordinates according to the layout of the images on the display panel 103 (Step S520) and then the controller 101 chooses one of the external hosts according to the display panel coordinates and generates the control signal accordingly (Step S530). The control signal may be transmitted to the multiplexer 105 to switch the access right of the peripheral apparatus 300 to the chosen external host.

Taking the layout LO1 as an example, the controller 101 may receive the mouse coordinates of the external host (e.g., the first host 200*a* or the second host 200*b*) from the external host having the access right of the peripheral apparatus 300, and converts the mouse coordinates of the external host into the display panel coordinates on the display panel 103. Specifically, in addition to receiving the mouse coordinates, the controller 101 may also receive image resolution information from each of the external hosts, so as to convert the mouse coordinates into the display panel coordinates according to the mouse coordinates, the resolution of the display panel 103, and the image resolutions of the external hosts.

For example, assuming that the resolution of the display panel 103 is 1920×2160, the image resolution of the first host 200*a* is 3840×2160, the image resolution of the second host 200*b* is 1920×2160, and each of the first image IMGa and the second image IMGb takes up a half of the layout LO1, the conversion into the display panel coordinates is as shown in Table 1 in the following.

TABLE 1

| | first host 200a | second host 200b |
|---|---|---|
| host image resolution | 3840 × 2160 | 1920 × 2160 |
| display panel resolution | 1920 × 2160 | 1920 × 2160 |
| initial display panel coordinates | (0, 0) | (1920, 0) |
| mouse coordinates | (x1, y1) | (x2, y2) |
| display panel coordinates | (x1 × 1920/3840 + 0, y1 × 2160/2160 + 0) | (x2 × 1920/1920 + 1920, y2 × 2160/2160 + 0) |

According to Table 1, the display panel coordinates of the first image IMGa on the display panel 103 are from (0, 0) to (2159, 1919), and the display panel coordinates of the second image IMGb on the display panel 103 are from (1920, 0) to (2159, 3839). The mouse coordinates (x1, y1) from the first host 200*a* are converted into the display panel coordinates (x1×1920/3840+0, y1×2160/2160+0), and the mouse coordinates (x2, y2) from the second host 200*b* are converted into the display panel coordinates (x2×1920/1920+1920, y2×2160/2160+0). For example, the mouse coordinates (100, 0) from the first host 200*a* is converted into the display panel coordinates (100×1920/3840+0, 0×2160/2160+0)=(50, 0), and the mouse coordinates (100, 0) from the second host 200*b* is converted into the display panel coordinates (100×1920/1920+1920, 0×2160/2160+0) =(2020, 0). Other coordinates may be converted based on the same principle.

If the mouse coordinates are from the first host 200*a*, the controller 101 may choose another external host to generate the control signal accordingly after converting the mouse coordinates into the display panel coordinates. For example, when the display panel coordinates converted from the mouse coordinates reach the rightmost of the first image IMGa, the controller 101 may choose the second host 200*b* corresponding to the second image IMGb to the right of the first image IMGa according to the layout LO1 and generate the control signal accordingly, so that the multiplexer 105 may switch the access right of the peripheral apparatus 300 to the second host 200*b*. Similarly, if the mouse coordinates are from the second host 200*b*, the controller 101 may choose another external host to generate the control signal accordingly after converting the mouse coordinates into the display panel coordinates. For example, when the display panel coordinates converted from the mouse coordinates reach the leftmost of the second image IMGb, the controller 101 may choose the first host 200*a* corresponding to the first image IMGa to the left of the second image IMGb and generate the control signal accordingly, so that the multiplexer 105 may switch the access right of the peripheral apparatus 300 to the first host 200*a*.

Taking the layout LO2 as an example, the controller 101 may similarly receive the mouse coordinates from the external host having the access right of the peripheral apparatus 300 and receive the image resolution information from each of the external hosts, and then converts the mouse coordinates into the display panel coordinates on the display panel 103 in a similar way according to the mouse coordinates, the resolution of the display panel 103, and the image resolutions of the external hosts.

If the mouse coordinates are from the first host 200*a*, the controller 101 may choose another external host to generate the control signal accordingly after converting the mouse coordinates into the display panel coordinates. For example, according to the layout LO2, when the display panel coordinates converted from the mouse coordinates enter the display area of the second image IMGb, the controller 101 may choose the second host 200*b* and generate the control signal accordingly, so that the multiplexer 105 may switch the access right of the peripheral apparatus 300 to the second host 200*b*. Alternatively, if the mouse coordinates are from the second host 200*b*, the controller 101 may choose another external host to generate the control signal accordingly after converting the mouse coordinates into the display panel coordinates. For example, when the display panel coordinates converted from the mouse coordinates reach the edge of the second image IMGb, the controller 101 may choose the first host 200*a* corresponding to the first image IMGa according to the layout LO2 and generate the control signal accordingly, so that the multiplexer 105 may switch the access right of the peripheral apparatus 300 to the first host 200*a*.

Figure 6:
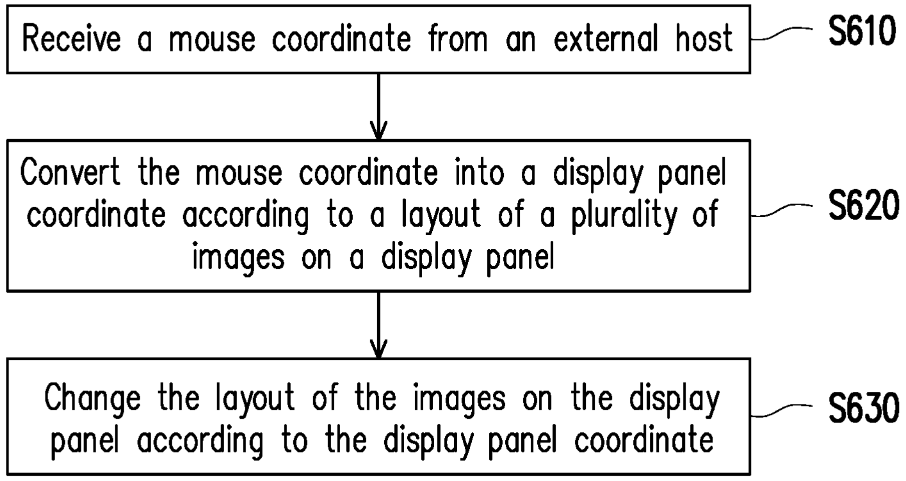
FIG. 6 is a flowchart illustrating an operating method of a display device according to an embodiment of the invention.

FIG. 6 is a flowchart illustrating an operating method of a display device according to an embodiment of the invention. In the embodiment, the display device 100 may change the layout of the images of the external hosts on the display panel 103 according to the received mouse coordinates.

Referring to FIG. 6, firstly, the controller 101 of the display device 100 may keep receiving the mouse coordinates of the external host from the external host having the access right of the peripheral apparatus 300 (Step S610). Then, the controller 101 may convert the mouse coordinates into the display panel coordinates according to the layout of the images on the display panel 103 (Step S620) and then change the layout of the images on the display panel 103 according to the display panel coordinates (Step S630). The process of receiving the mouse coordinates and converting the mouse coordinates into the display panel coordinates have been described in the foregoing and will thus not be repeated in the following.

Taking the layout LO2 as an example, the control right of the cursor of the mouse constantly belong to the host (the first host 200*a*) corresponding to the main image (the first image IMGa), and the controller 101 converts the mouse coordinates of the main image into the display panel coordinates. If the controller 101 detects that the display panel coordinates of the mouse cursor are about to enter the display area of the second image IMGb, the controller 101 may move the second image IMGb to prevent the second image IMGb from overlapping the mouse cursor. For example, the display panel coordinates converted from the mouse coordinates entering the display area of the second image IMGb may indicate that the user intends to perform an operation in the portion of the first image IMGa shielded by the second image IMGb. Therefore, the controller 101 may move the second image IMGb away (e.g., moving the second image IMGb from the lower right area to the upper right area of the display panel 103, but the invention is not limited thereto), so that the cursor of the mouse is still operated on the first image IMGa.

The controller 101 in the embodiments of FIGS. 5 and 6 may receive the mouse coordinates of the external host from the external host having the access right of the peripheral apparatus 300 and convert the mouse coordinates into the display panel coordinates according to the layout of the images on the display panel 103. The controller 101 in the embodiment of FIG. 5 may switch the access right of the peripheral apparatus 300 among the external hosts according to the display panel coordinates, and the controller 101 in the embodiment of FIG. 6 may change the layout of one or more images on the display panel 103 according to the display panel coordinates.

Figure 7:
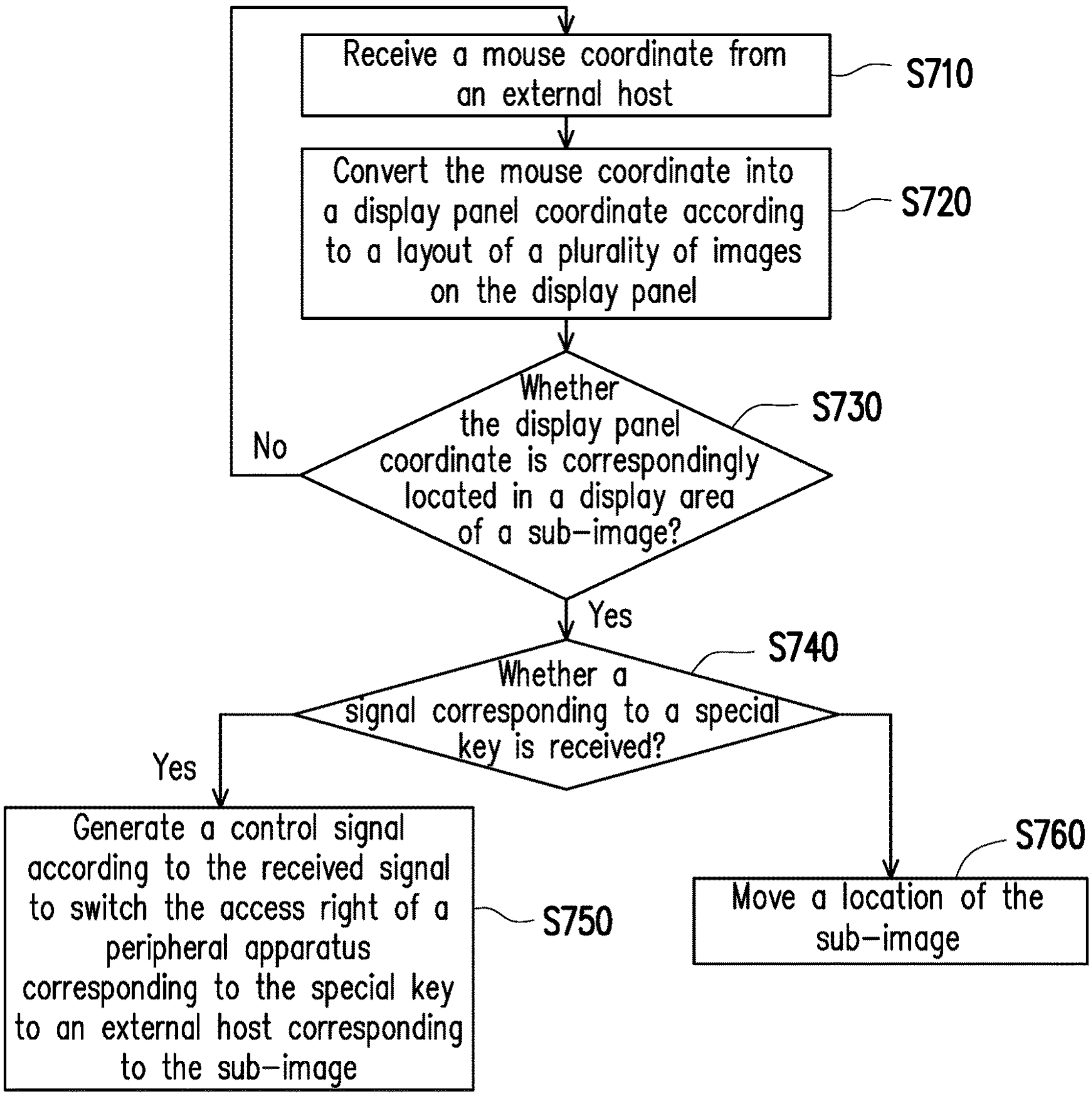
FIG. 7 is a flowchart illustrating an operating method of a display device according to an embodiment of the invention.

FIG. 7 is a flowchart illustrating an operating method of a display device according to an embodiment of the invention. In the embodiment, the user may transmit a signal (e.g., by hitting a special key on the keyboard) to instruct the controller 101 to switch the access right of the peripheral apparatus 300 among the external hosts according to the display panel coordinates as described in the embodiment of FIG. 5 or change the layout of the images on the display panel 103 as described in the embodiment of FIG. 6. In the embodiment, the display panel 103 displays the images of the hosts as a main image and a sub-image. In other words, the images on the display panel 103 are overlapped with each other.

Referring to FIG. 7, firstly, the controller 101 of the display device 100 may keep receiving the mouse coordinates of the external host from the external host having the access right of the peripheral apparatus 300 (Step S710). In the embodiment, the external host having the access right of the peripheral apparatus 300 is the external host corresponding to the main image. Then, the controller 101 may convert the mouse coordinates into the display panel coordinates according to the layout of the images on the display panel 103 (Step S720), and determine whether the display panel coordinates are correspondingly located in the display area of the sub-image according to the layout of the images (Step S730). If the display panel coordinates are in the display area corresponding to the sub-image, the controller 101 may determine whether a signal corresponding to a special key is received from the external host having the access right of the peripheral apparatus 300 (Step S740). If the controller 101 determines that the signal corresponding to the special key is received from the external host having the access right of the peripheral apparatus 300, the controller 101 may generate the control signal according to the signal, so as to switch the access right of the peripheral apparatus 300 corresponding to the special key to the external host corresponding to the sub-image (Step S750). Alternatively, if the controller 101 determines that the signal corresponding to the special key is not received from the external host having the access right of the peripheral apparatus 300, the controller 101 may move the position of the sub-image on the display panel 103 (Step S760). The processes of receiving the mouse coordinates, converting the mouse coordinates into the display panel coordinates, and determining whether the display panel coordinates enter the sub-image have been described in the foregoing and will thus not be repeated in the following. Besides, the process of moving the position of the sub-image on the display panel 103 has also been described in the embodiment of FIG. 6 and will thus not be repeated in the following.

Taking the layout LO2 as an example, the main image is the first image IMGa corresponding to the first host 200*a*, and the sub-image is the second image IMGb corresponding to the second host 200*b*. The controller 101 may receive the mouse coordinates from the first host 200*a* and convert the mouse coordinates into the display panel coordinates according to the layout LO2. The user may use a special key to control the controller 101 to switch the access right of the peripheral apparatus 300 when the display panel coordinates enter the display area of the second image IMGb, and may use different special keys to determine of which peripheral apparatus 300 the access right is to be switched. Alternatively, if the user chooses not to hit a special key, the controller 101 may move the position of the second image IMGb when the display panel coordinates enter the display area of the second image IMGb.

For example, the user may hit a first special key on the keyboard when the display panel coordinates enter the display area of the second image IMGb. At this time, the first host 200*a* may transmit a signal corresponding to the first special key to the controller 101. Accordingly, when the display panel coordinates enter the display area of the second image IMGb, the controller 101 may determine that the signal corresponding to the first special key from the first host 200*a* is received and may generate the control signal according to the signal to switch the access right of the peripheral apparatus 300 or the transmission interface (e.g., switching the access right of the keyboard and the mouse but not the storage device) corresponding to the first special key to the second host 200*b*. In addition, the user may also hit a second special key on the keyboard when the display panel coordinates enter the display area of the second image IMGb. At this time, the first host 200*a* may transmit a signal corresponding to the second special key to the controller 101. Accordingly, when the display panel coordinates enter the display area of the second image IMGb, the controller 101 may determine that the signal corresponding to the second special key from the first host 200*a* is received and may generate the control signal according to the signal to switch the access right of the peripheral apparatus 300 or the transmission interface (e.g., including switching the keyboard, the mouse, the storage device) corresponding to the second special key to the second host 200*b*. If the user does not hit any special key when the display panel coordinates enter the display area of the second image IMGb, the controller 101 may move the position of the second image IMGb when the display panel coordinates enter the display area of the second image IMGb.

Accordingly, the user is allowed to conveniently perform operations on the images of the external hosts.

It should be noted that the communication between the external hosts (e.g., the first host 200*a* and the second host 200*b*) and the controller 101 of the display device 100, including the transmission of the mouse coordinates and the image resolution, may be achieved through a communication protocol of the display data channel command interface (DDC/CI), for example. However, in some embodiments, some external hosts (e.g., mobile phones) are not compatible with such type of communication protocol. In the following, an operating method of a display device is described. The operating method is capable of successfully and smoothly switching the access right of the peripheral apparatus 300 when some of the external hosts are not compatible with the DDC/CI communication protocol.

Figure 8:
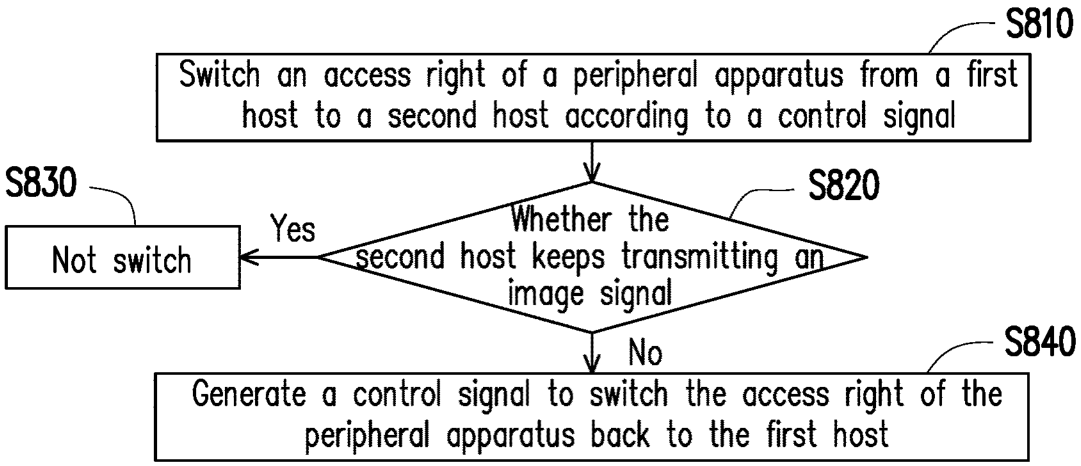
FIG. 8 is a flowchart illustrating an operating method of a display device according to an embodiment of the invention.

FIG. 8 is a flowchart illustrating an operating method of a display device according to an embodiment of the invention. In the embodiment, after the display device 100 switches the access right of the peripheral apparatus 300 from one of the external hosts to another external host, if the another external host has not transmitted an image signal to the display device 100 for the display device 100 to display for a predetermined period of time, the access right of the peripheral apparatus 300 is switched back to the original external host. Therefore, even if the another external host is not compatible with the DDC/CI communication protocol, the access right of the peripheral apparatus 300 can also be switched favorably.

Referring to FIG. 8, firstly, the controller 101 may generate the control signal and transmit the control signal to the multiplexer 105, and the multiplexer 105 may switch the access right of the peripheral apparatus 300 from the first host 200*a* to the second host 200*b* (Step S810). Then, the controller 101 may determine whether the second host 200*b* keeps transmitting the image signal (Step S820). For example, the controller 101 may determine whether the image signal from the second host 200*b* is discontinued for over a time threshold (such as 3 seconds, but the invention is not limited thereto), and determines that the second host 200*b* does not keep transmitting the image signal if the image signal from the second host 200*b* is discontinued for over the time threshold. If the controller 101 determines that the second host 200*b* keeps transmitting the image signal, the access right of the peripheral apparatus 300 is not switched (step S830). Alternatively, if the controller 101 determines that the second host 200*b* does not keep transmitting the image signal, the controller 101 may generate the control signal, so that the multiplexer 105 may switch the access right of the peripheral apparatus 300 back to the first host 200*a* (Step S840).

Accordingly, the second host 200*b* may make the display device 100 switch the access right of the peripheral apparatus 300 by discontinuing the transmission of the image signal to the controller 101.

Taking the layout LO2 as an example, when the access right of the peripheral apparatus 300 is switched from the first host 200*a* to the second host 200*b*, the second host 200*b* may obtain the mouse coordinates and determine whether the mouse coordinates are moved to the edge of the second image IMGb. When determining that the mouse coordinates are moved to the edge of the second image IMGb, the second host 200*b* may discontinue the transmission of the image signal to the controller 101. In this way, according to the flow in the embodiment of FIG. 8, the display device 100 may automatically switch the access right of the peripheral apparatus 300 back to the first host 200*a*.

Figure 9:
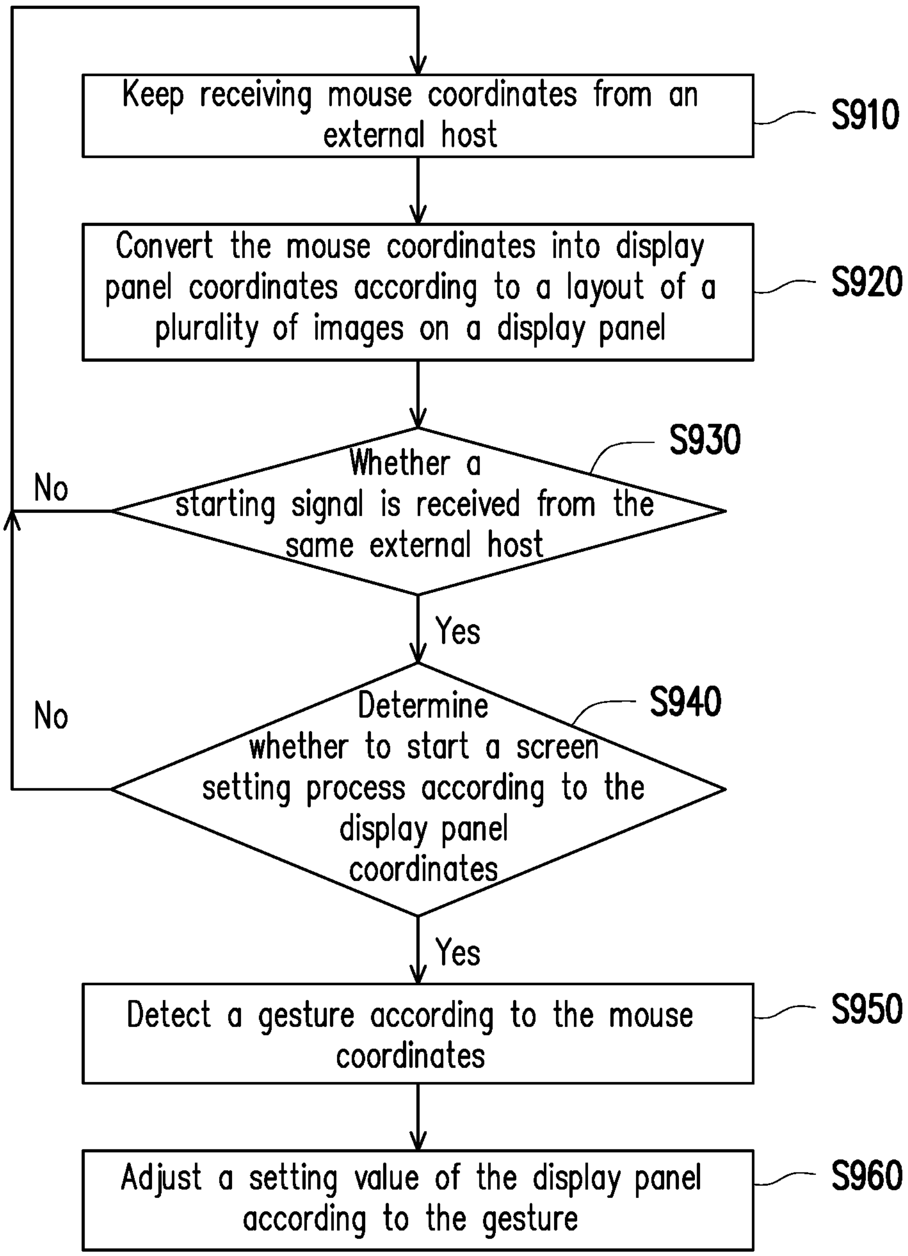
FIG. 9 is a flowchart illustrating an operating method of a display device according to an embodiment of the invention.

FIG. 9 is a flowchart illustrating an operating method of a display device according to an embodiment of the invention. In the embodiment, the display device 100 may start a screen setting process of the display panel 103 according to the mouse coordinates and a starting signal that are received.

Referring to FIG. 9, firstly, the controller 101 of the display device 100 may keep receiving the mouse coordinates of the external host from the external host having the access right of the peripheral apparatus 300 (Step S910), and convert the mouse coordinates into the display panel coordinates according to the layout of the images on the display panel 103 (Step S920). The process of receiving the mouse coordinates and converting the mouse coordinates into the display panel coordinates have been described in the foregoing and will thus not be repeated in the following.

Besides, the controller 101 may also determine whether the starting signal is also received from the same external host (i.e., the external host having the access right of the peripheral apparatus 300) (Step S930). For example, when intending to start the screen setting process, the user may hit a special key on the keyboard to trigger the external host having the access right of the peripheral apparatus 300 to transmit the starting signal to the controller 101. Starting the screen setting process includes, for example, enabling an on-screen display (OSD) adjusting function of the display panel 103. However, the invention is not limited thereto.

When the controller 101 determines that the starting signal is received from the external host having the access right of the peripheral apparatus 300, the controller 101 may determine whether to start the screen setting process according to the display panel coordinates (Step S940). For example, the controller 101 may define a predetermined area on the display panel 103, and may determine to start the screen setting process, such as enabling the OSD adjusting function, when the starting signal is received and the display panel coordinates enter the predetermined area.

After starting the screen setting process, the controller 101 may detect a gesture according to the mouse coordinates (Step S950). For example, after the screen setting process is started, the user may choose the property (e.g., brightness) of the display panel 103 to be adjusted, and may drag the mouse to create a gesture (e.g., a gesture of dragging rightward or leftward), so as to make an adjustment. The controller 101 may detect the gesture of the user according to the received mouse coordinates.

Then, the controller 101 may adjust a setting value of the display panel 103 according to the detected gesture (Step S960). For example, when the property of the display panel 103 to which the user chooses to make an adjustment is brightness and a gesture of dragging rightward is created, the controller 101 may increase the setting value on the brightness of the display panel 103 according to the detected gesture. When the property of the display panel 103 to which the user chooses to make an adjustment is brightness and a gesture of dragging leftward is created, the controller 101 may decrease the setting value on the brightness of the display panel 103 according to the detected gesture.

Accordingly, the user is allowed to conveniently move the mouse and input a special key to start the screen setting process, so as to adjust the setting value of the display panel 103.

In view of the foregoing, the display device and the operating method thereof according to the embodiments of the invention are capable of connecting the plurality of external hosts and the peripheral apparatus such as the keyboard, the mouse, etc., and are capable of favorably switching the access right of the peripheral apparatus among the external hosts while simultaneously displaying the images of the external hosts. Besides, in some embodiments, the display device is capable of receiving the mouse coordinates from the external host and automatically switching the access right of the peripheral apparatus among the external hosts accordingly, automatically adjusting the layout of the images on the display panel, or starting the screen setting process, thereby making the use more convenient.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display device, comprising:

a display panel, configured to simultaneously display a plurality of images of a plurality of external hosts, wherein the display device has one single display panel;

a connector, coupled to at least one peripheral apparatus;

a controller, coupled to the display panel, the connector, and the external hosts, and configured to generate a control signal; and a multiplexer, coupled between the controller, the connector, and the external hosts, and configured to switch an access right of the at least one peripheral apparatus to one of the external hosts according to the control signal, wherein the controller receives switching information from the external hosts and generates the control signal according to the switching information, wherein when the access right of the at least one peripheral apparatus is switched from a first host to a second host among the external hosts according to the control signal, a cursor in the display panel moved automatically from a first image of the first host moves to a second image of the second host, and the second image overlaps the first image, and blocks partial area of the first image, wherein when the access right of the at least one peripheral apparatus belongs the first host, the controller moves the second image away to other area once the controller detects the cursor entering the display area of the second image, wherein the controller chooses one of the external hosts according to the switching information and a layout of the images on the display panel, and generates the control signal to switch the access right of the at least one peripheral apparatus to the chosen external host.

2. The display device as claimed in claim 1, wherein the at least one peripheral apparatus comprises a plurality of peripheral apparatuses, and the controller chooses at least one of the plurality of peripheral apparatuses according to the switching information and generates the control signal to switch the access right of the at least one of the plurality of peripheral apparatuses to the chosen external host.

3. The display device as claimed in claim 1, wherein the controller receives a mouse coordinate from one of the external hosts, and converts the mouse coordinate into a display panel coordinate according to a layout of the images on the display panel.

4. The display device as claimed in claim 3, wherein the controller chooses one of the external hosts according to the display panel coordinate and generates the control signal to switch the access right of the peripheral apparatus to the chosen external host.

5. The display device as claimed in claim 3, wherein the controller changes the layout of the images on the display panel according to the display panel coordinate.

6. The display device as claimed in claim 1, wherein the controller generates the control signal according to whether the external hosts transmit an image signal or not, so as to switch the access right of the at least one peripheral apparatus to the one of the external hosts.

7. The display device as claimed in claim 1, wherein the peripheral apparatus comprises at least one of a keyboard, a mouse, and a storage apparatus.

8. An operating method of a display device, wherein the display device is connected with a plurality of external hosts and at least one peripheral apparatus, the operating method comprising:

simultaneously displaying a plurality of images of the external hosts through a display panel, wherein the display device has one single display panel;

generating a control signal;

switching an access right of the at least one peripheral apparatus to one of the external hosts according to the control signal;

receiving switching information from the external hosts; and generating the control signal according to the switching information, wherein when the access right of the at least one peripheral apparatus is switched from a first host to a second host among the external hosts according to the control signal, a cursor in the display panel moved automatically from a first image of the first host moves to a second image of the second host, and the second image overlaps the first image, and blocks partial area of the first image, wherein when the access right of the at least one peripheral apparatus belongs the first host, moving the second image away to other area once detecting the cursor entering the display area of the second image, wherein generating the control signal according to the switching information comprises:

choosing one of the external hosts according to the switching information and a layout of the images on the display panel; and generating the control signal to switch the access right of the at least one peripheral apparatus to the chosen external host.

9. The operating method as claimed in claim 8, wherein the at least one peripheral apparatus comprises a plurality of peripheral apparatuses, and generating the control signal according to the switching information further comprises:

choosing at least one of the plurality of switching apparatuses according to the switching information; and generating the control signal to switch the access right of the at least one of the plurality of peripheral apparatuses to the chosen external host.

10. The operating method as claimed in claim 8, further comprising:

receiving a mouse coordinate from one of the external hosts; and converting the mouse coordinate into a display panel coordinate according to a layout of the images on the display panel.

11. The operating method as claimed in claim 10, wherein generating the control signal comprises:

choosing one of the external hosts according to the display panel coordinate; and generating the control signal to switch the access right of the peripheral apparatus to the chosen external host.

12. The operating method as claimed in claim 10, further comprising:

changing the layout of the images on the display panel according to the display panel coordinate.

13. The operating method as claimed in claim 8, wherein generating the control signal comprises:

generating the control signal according to whether the external hosts transmit an image signal or not; and switching the access right of the at least one peripheral apparatus to the one of the external hosts.

14. The operating method as claimed in claim 8, wherein the peripheral apparatus comprises at least one of a keyboard, a mouse, and a storage apparatus.

15. A display device, comprising:

a controller, coupled to a plurality of external hosts;

a display panel, coupled to the controller and configured to simultaneously display a plurality of images of the external hosts, wherein the display device has one single display panel; and a connector, coupled to the controller, and configured to be connected with a mouse, wherein one of the external hosts has an access right of the mouse, wherein the controller is further configured to:

receive a mouse coordinate from the one of the external hosts;

convert the mouse coordinate into a display panel coordinate according to a layout of the images on the display panel; and activate a screen setting process according to the display panel coordinate, wherein when the access right of the mouse is switched from a first host to a second host among the external hosts according to the control signal, a cursor in the display panel moved automatically from a first image of the first host moves to a second image of the second host, and the second image overlaps the first image, and blocks partial area of the first image, wherein when the access right of the at least one peripheral apparatus belongs the first host, the controller moves the second image away to other area once the controller detects the cursor entering the display area of the second image, wherein the controller chooses one of the external hosts according to the switching information and a layout of the images on the display panel, and generates the control signal to switch the access right of the mouse to the chosen external host.

16. The display device as claimed in claim 15, wherein the controller is further configured to receive a starting signal from the one of the external hosts and start the screen setting process according to the display panel coordinate and the starting signal.

17. The display device as claimed in claim 15, wherein after starting the screen setting process, the controller is further configured to:

detect a gesture according to the mouse coordinate; and adjust a setting value of the display panel according to the gesture.

18. The display device as claimed in claim 1, wherein a cursor generating device is among the at least one peripheral apparatus, and the controller is configured to determine whether a coordinate of the cursor generating device is about to move from a display area of one of the first image and the second image to a display area of the other of the first image and the second image, and when it is determined that the coordinate of the cursor generating device is about to move from the display area of one of the first image and the second image to the display area of the other of the first image and the second image, the control signal is generated by the controller to the multiplexer to switch the access right of the at least one peripheral apparatus from one of the first host and the second host to the other of the first host and the second host, and the cursor in the display panel moves from the display area of one of the first image and the second image to the display area of the other of the first image and the second image.

19. The operating method as claimed in claim 8, wherein a cursor generating device is among the at least one peripheral apparatus, and the operating method further comprises:

determining whether a coordinate of the cursor generating device is about to move from a display area of one of the first image and the second image to a display area of the other of the first image and the second image; and when it is determined that the coordinate of the cursor generating device is about to move from the display area of one of the first image and the second image to the display area of the other of the first image and the second image, generating the control signal to switch the access right of the at least one peripheral apparatus from one of the first host and the second host to the other of the first host and the second host, and moving the cursor in the display panel from the display area of one of the first image and the second image to the display area of the other of the first image and the second image.

20. The display device as claimed in claim 15, wherein a cursor generating device is among the at least one peripheral apparatus, and the controller is further configured to determine whether a coordinate of the cursor generating device is about to move from a display area of one of the first image and the second image to a display area of the other of the first image and the second image, and when it is determined that the coordinate of the cursor generating device is about to move from the display area of one of the first image and the second image to the display area of the other of the first image and the second image, the control signal is generated by the controller to the multiplexer to switch the access right of the at least one peripheral apparatus from one of the first host and the second host to the other of the first host and the second host, and the cursor in the display panel moves from the display area of one of the first image and the second image to the display area of the other of the first image and the second image.

* * * * *